(12) United States Patent
D'Souza et al.

(10) Patent No.: US 7,774,500 B1
(45) Date of Patent: Aug. 10, 2010

(54) METHOD AND APPARATUS FOR FLEXIBLE NETWORK MANAGEMENT OF MULTIPLE CUSTOMER VIRTUAL PRIVATE NETWORKS

(75) Inventors: Kevin D'Souza, Cranbury, NJ (US); Leah Zhang, Holmdel, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1730 days.

(21) Appl. No.: 10/940,548

(22) Filed: Sep. 14, 2004

Related U.S. Application Data (60) Provisional application No. 60/584,827, filed on Jul. 1, 2004.

(51) Int. Cl.
*G06F 15/173* (2006.01)
(52) U.S. Cl. .................. 709/242; 709/220; 709/223
(58) Field of Classification Search .......... 709/220, 709/223, 242
See application file for complete search history.

(56) References Cited

U.S. PATENT DOCUMENTS

| | | | | |
|---|---|---|---|---|
| 7,152,115 | B2 * | 12/2006 | Brahim et al. | 709/238 |
| 7,411,955 | B2 * | 8/2008 | Li et al. | 370/392 |
| 7,441,023 | B2 * | 10/2008 | Benjamin et al. | 709/223 |
| 7,653,050 | B2 * | 1/2010 | Brahim | 370/353 |
| 2007/0280241 | A1 * | 12/2007 | Verma | 370/392 |

\* cited by examiner

*Primary Examiner*—Michael Won (57) ABSTRACT

The invention comprises a method and apparatus for deriving at least one router configuration of at least one datacenter edge router and at least one provider edge router to support at least one datacenter managing at least one customer virtual private network. Specifically, the method comprises assigning at least one datacenter profile to the at least one datacenter, and assigning a datacenter profile route-target to the at least one datacenter profile.

17 Claims, 5 Drawing Sheets

METHOD AND APPARATUS FOR FLEXIBLE NETWORK MANAGEMENT OF MULTIPLE CUSTOMER VIRTUAL PRIVATE NETWORKS

This application claims the benefit of U.S. Provisional Application No. 60/584,827 filed on Jul. 1, 2004, which is incorporated herein by reference.

FIELD OF THE INVENTION

The invention relates to the field of communications networks, and more specifically, to the management of customer virtual private networks.

BACKGROUND OF THE INVENTION

As service provider networks and service offerings continue to evolve, the corresponding operations model used by service providers to manage those networks and service offerings, and the associated network assets, tend to evolve as well. As a result, large service providers often change operations models for managing the networks and services by adding new network operations centers, deleting existing network operations centers, realigning network operation center responsibilities, and changing network operation center geographic scopes of responsibility.

Unfortunately, in the case of virtual private networks, reconfiguration of a service provider operations model (and the resulting changes to the associated network operations centers) currently requires the reconfiguration of any associated customer virtual private networks. This approach incurs both large systems and operational costs, and results in disruptions to the active customer virtual private networks. Furthermore, this approach is simply not scalable as the size of networks, and the associated number of customer virtual private networks, continues to grow.

While several designs have been proposed in order to address this problem, each of those solutions lacks some functionality or another. For example, one solution utilized a common route-target that was assigned to all network operations centers within a region. While this method did not require extensive reconfiguration of the associated customer virtual private networks when the network operations center footprint changed, it provided no means of distinguishing between network operations center types (e.g., network-facing versus customer-facing). A related issue was the inability to block network-facing network operations center routes from leaking into the customer virtual private networks since there was no easy way of separating them. Furthermore, this design did not allow for the categorization of managed network assets by type, and thus was not scalable from the standpoint of the network management of customer virtual private networks.

As such, a need exists in the art for a method of deriving router configurations of at least one datacenter edge router and at least one provider edge router to support at least one datacenter managing at least one customer virtual private network.

SUMMARY OF THE INVENTION

In one embodiment, the invention comprises a method and apparatus for deriving at least one router configuration of at least one datacenter edge router and at least one provider edge router to support at least one datacenter managing at least one customer virtual private network. Specifically, the method comprises assigning at least one datacenter profile to the at least one datacenter, assigning a datacenter profile route-target to the at least one datacenter profile, deriving a datacenter router export configuration for exporting the datacenter profile route-target, and deriving a datacenter router import configuration for importing the datacenter profile route-target.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of a service provider backbone network supporting a plurality of customer virtual private networks; however, the methodology of the invention can readily be applied to other network topologies. In general, the present invention supports large-scale growth in a service provider's virtual private network customer base by simplifying the management of the customer virtual private networks by service provider datacenters. By assigning unique route-targets to datacenter profiles and managed asset profiles, a robust network operations model is defined that limits the impact to customer virtual private networks as a result of changes to the datacenters responsible for managing those customer virtual private networks.

In other words, the present invention obviates the need to reconfigure customer virtual private networks in response to the addition of a new datacenter, change of the datacenter type, narrowing of the datacenter geographic scope of responsibility, broadening of the datacenter geographic scope of responsibility, and the like, either singly or in combination. Furthermore, the methodology of the present invention obviates the need to reconfigure a large number of customer virtual private networks in response to changes in managed asset types and managed asset geographic locations, either singly or in combination, supported by a particular datacenter.

Figure 1:
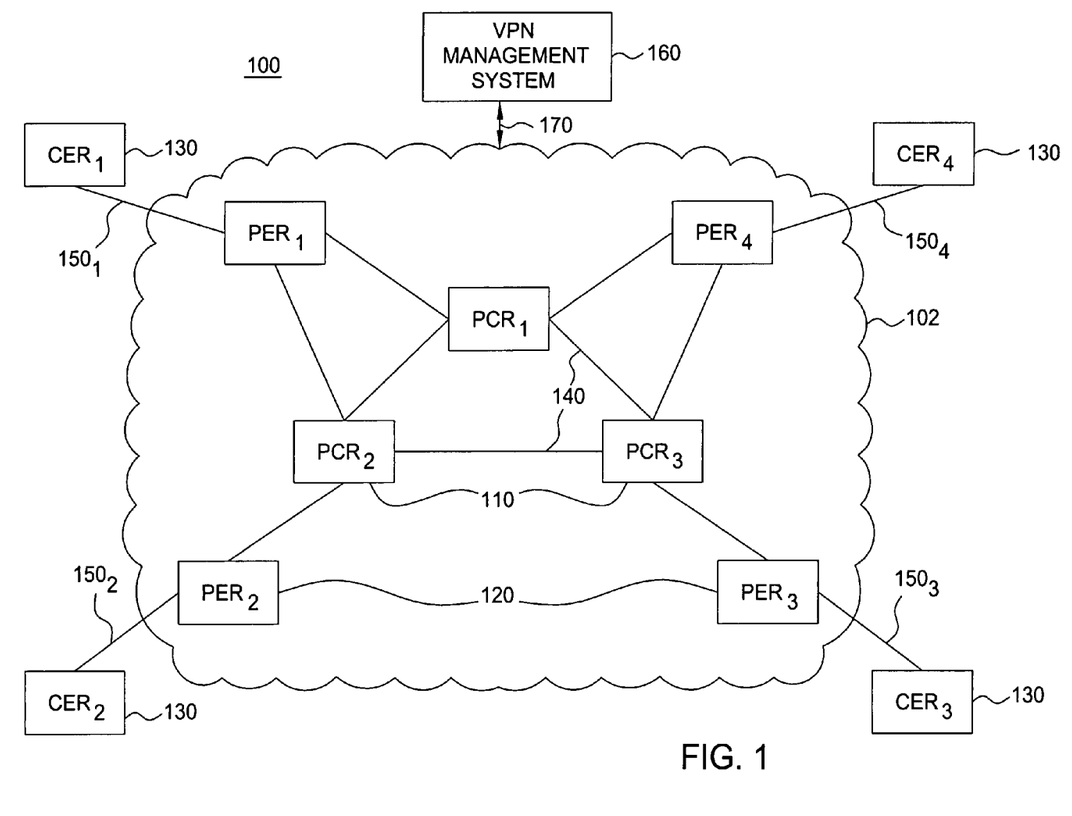
FIG. 1 depicts an exemplary virtual private network including a plurality of customer endpoints, a plurality of service provider edge equipment, and a core network interconnecting the provider edge equipment.

FIG. 1 depicts an exemplary virtual private network including a plurality of customer edge equipment, a plurality of service provider edge equipment, and a core network interconnecting the provider edge equipment. Specifically, the virtual private network 100 of FIG. 1 comprises a plurality of provider core routers ($PCR_1$-$PCR_3$) 110, a plurality of provider edge routers ($PER_1$-$PER_4$) 120, and a plurality of customer edge routers ($CER_1$-$CER_4$) 130. The provider core routers 110 and the provider edge routers 120 communicate via core communication links 140. The provider core routers 110, provider edge routers 120, and core communication links 140 typically belong to a telecommunications service provider (such as AT&T) and as such, are collectively denoted as service provider network 102 in FIG. 1.

As depicted in FIG. 1, service provider network 102 is managed by a virtual private network management system 160. The virtual private network management system 160 communicates with the service provider network 102 via at least one 170. As such, the virtual private network management system 160 communicates with each of the plurality of provider core routers 110, as well as each of the plurality of provider edge routers 120. In one embodiment, at least one communication link 170 is connected to at least one of the provider core routers 110 and the provider edge routers 120, providing direct access from the virtual private network management system 160 to the virtual private network 100 of FIG. 1.

In one embodiment, a service provider's network management boundary extends beyond the edges of the service provider's network into a customer's sub-network. As depicted in FIG. 1, for example, the reach of the virtual private network management system 160 would extend beyond the edge of the service provider network 102, in which case the virtual private network management system 160 could potentially communicate with one or more of the plurality of customer edge routers 130.

The plurality of customer edge routers 130 communicate with the plurality of provider edge routers 120 via the edge communication links 150. As depicted in FIG. 1, each of the customer edge routers 130 ($CER_1$ through $CER_4$) communicates with each of the provider edge routers 120 ($PER_1$ through $PER_4$) via the edge communication links $150_1$, $150_2$, $150_3$, and $150_4$, respectively. Thus, since each customer edge router 130 belongs to the same virtual private network, each of the customer edge routers 130 is able to send and receive data packets from every other customer edge router 130.

The customer edge routers 130 typically operate as gateways by which customer sub-networks (not shown) connect to a telecommunication service provider's backbone network (illustratively, service provider network 102). A customer sub-network typically includes at least one customer edge router, as well as computers, telephones, facsimile machines, and other networking equipment located at a particular customer location. A customer sub-network may also include other managed assets such as digital switching units, circuit switching units, firewalls, and the like.

Although only one virtual private network is depicted in FIG. 1, numerous virtual private networks may be supported by the service provider network 102 depicted in FIG. 1. As such, the service provider network 102 may include fewer or more provider core routers, fewer or more provider edge routers, and fewer or more core communication links. Thus, although depicted as a one-to-one relationship between the customer edge routers 130 and the provider edge routers 120, numerous other customer edge routers (not shown) belonging to other virtual private networks (not shown) may communicate with the provider edge routers 120.

Figure 2:
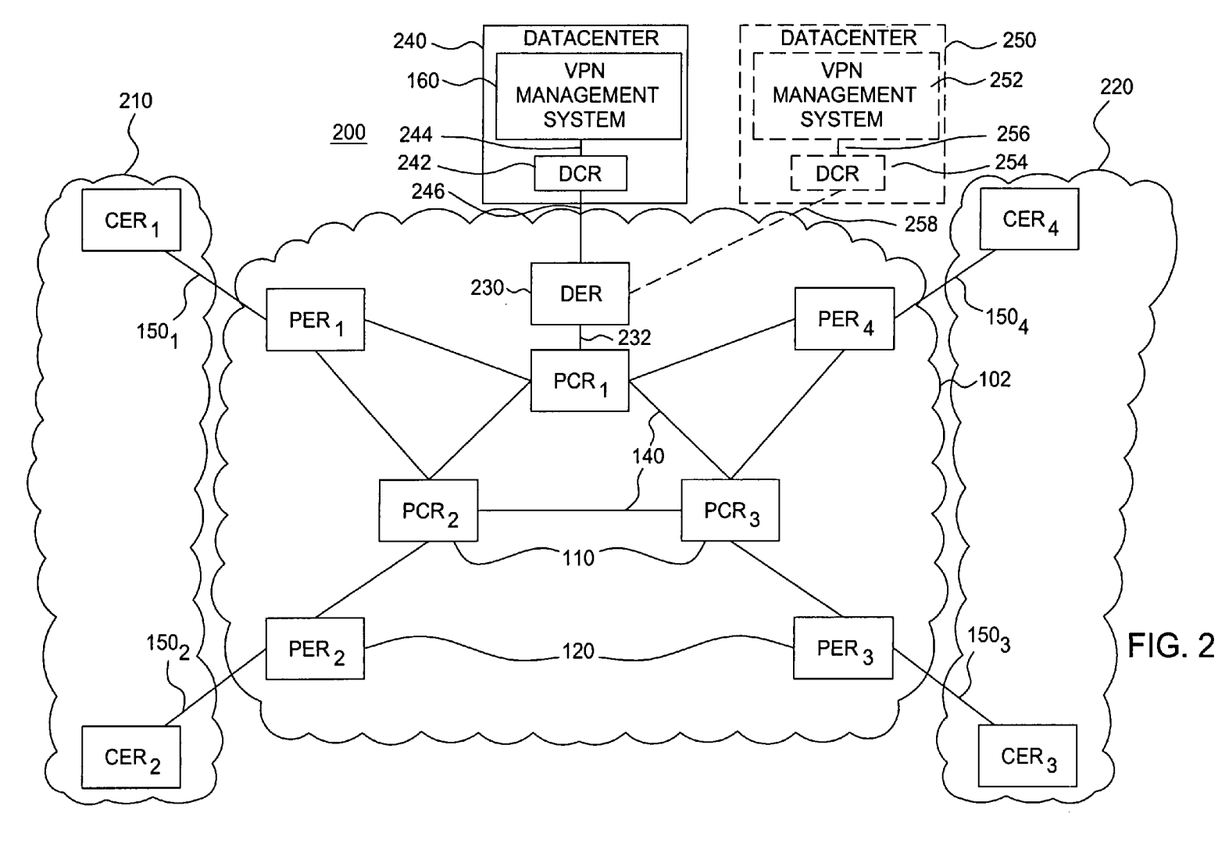
FIG. 2 depicts a network architecture including two virtual private networks communicating over the service provider network 102 of FIG. 1.

FIG. 2 depicts a network architecture including two virtual private networks communicating over the service provider network 102 of FIG. 1. Specifically, the network architecture 200 of FIG. 2 comprises a first virtual private network 210 (VPN1) and a second virtual private network 220 (VPN2). The first virtual private network 210 comprises customer edge router $CER_1$ and customer edge router $CER_2$. The second virtual private network 220 comprises customer edge router $CER_3$ and customer edge router $CER_4$. As depicted in FIG. 1 and described above, customer edge routers $CER_1$, $CER_2$, $CER_3$ and $CER_4$ communicate via the service provider network 102.

As depicted in FIG. 2, the first virtual private network 210 is located within the United States, and the second virtual private network 220 is located within Europe, the Middle East, and Africa. Although the first virtual private network 210 and the second virtual private network 220 are both carried over the service provider network 102, the virtual private networks are transparent to each other. Although only two virtual private networks are depicted, fewer or more virtual private networks may be supported by the service provider network 102. Although the first virtual private network 210 and the second virtual private network 220 are each depicted as comprising two customer edge routers, fewer or more customer edge routers may be included within a virtual private network.

In many instances, virtual private network customers contract with a service provider to have the service provider manage their virtual private network assets. The first virtual private network 210 and the second virtual private network 220 are managed virtual private networks. In other words, the first virtual private network 210 (as well as the associated assets) and the second virtual private network 220 (as well as the associated assets) are managed by a service provider network management system (illustratively, virtual private network management system 160).

As depicted in FIG. 2, the managed assets of the first virtual private network 210 include the customer edge router $CER_1$ and associated edge communication link $150_1$, and the customer edge router $CER_2$ and associated edge communication link $150_2$. Similarly, the managed assets of the second virtual private network 220 include customer edge router $CER_3$ and associated edge communication link $150_3$, and customer edge router $CER_4$ and associated edge communication link $150_4$. Although not depicted in FIG. 2, the first virtual private network 210 and the second virtual private network 220 may each include additional managed assets (such as customer loop-back links, digital switching units, circuit switching units, firewalls, and the like).

A service provider's management systems typically reside in a service provider datacenter (network operations center). As depicted in FIG. 2, the virtual private network management system 160, and possibly other management systems (not depicted), reside in the datacenter 240. The virtual private network management system 160 communicates with a datacenter core router (DCR) 242 via communications link 244. The datacenter core router 242 communicates with a datacenter edge router 230 that is located within the service provider network 102 via communications link 246. The datacenter edge router (DER) 230 communicates with provider core router $PCR_1$ via communications link 232.

A unique route distinguisher is assigned to a datacenter participating in the management of the service provider network. A unique virtual private network routing/forwarding instance name (VRF-Name) is assigned to the datacenter participating in the management of the service provider network. The unique route distinguisher and VRF-Name are configured on the datacenter edge router that provides that datacenter with connectivity into the managed network. As depicted in FIG. 2, the unique route distinguisher and unique VRF-Name are assigned in the virtual private network management system 160 and configured on the datacenter edge router 230.

Using the methodology of the present invention, a datacenter profile is defined for each pair-wise combination of datacenter type and datacenter geographic scope of responsibility. A datacenter type corresponds to the type of management functionalities performed by a datacenter. Some examples of datacenter types include network care datacenters (NCD), customer care datacenters (CCD), and the like. Fewer or more datacenter types may be defined.

A datacenter geographic scope of responsibility corresponds to a geographic region of the world in which the customer virtual private networks (and associated managed assets) that are managed by a particular datacenter are located. Some examples of datacenter geographic scopes of responsibility include global (GBL), Most of World (MOW), Europe/Middle East/Africa (EMEA), Asian/Pacific (AP), United States (US), Canada/Latin America (CALA), Canada (CAN), and the like. The Most of World (MOW) region is defined as any location outside of the United States. Fewer or more datacenter geographic scopes of responsibility may be defined.

A separate profile is defined for each combination of datacenter type and datacenter geographic scope of responsibility. The virtual private network management system 160 assigns a unique route-target to each datacenter profile. TABLE 1 lists the datacenter profiles defined for each combination of datacenter type and datacenter geographic scope of responsibility described above. Since fewer or more datacenter types and datacenter geographic scopes of responsibility may be defined, fewer or more corresponding datacenter profiles than those depicted in TABLE 1 may be defined.

TABLE 1

| Datacenter Type | Datacenter Geographic Scope of Responsibility | Datacenter Profile | Route-Target Assignment |
|---|---|---|---|
| NCD | GLBL | NCD_GBL | 13976:102000 |
| NCD | MOW | NCD_MOW | 13976:102010 |
| NCD | EMEA | NCD_EMEA | 13976:102020 |
| NCD | AP | NCD_AP | 13976:102030 |
| NCD | US | NCD_US | 13976:102040 |
| NCD | CALA | NCD_CALA | 13976:102050 |
| NCD | CAN | NCD_CAN | 13976:102060 |
| CCD | GLBL | CCD_GBL | 13976:102100 |
| CCD | MOW | CCD_MOW | 13976:102110 |
| CCD | EMEA | CCD_EMEA | 13976:102120 |
| CCD | AP | CCD_AP | 13976:102130 |
| CCD | US | CCD_US | 13976:102140 |
| CCD | CALA | CCD_CALA | 13976:102150 |
| CCD | CAN | CCD_CAN | 13976:102160 |

As depicted in TABLE 1, the valid datacenter profiles defined using combinations of datacenter type and datacenter geographic scope of responsibility include NCD_GBL, NCD_MOW, NCD_EMEA, NCD_AP, NCD_US, NCD_CALA, NCD_CAN, CCD_GBL, CCD_MOW, CCD_EMEA, CCD_AP, CCD_US, CCD_CALA, and CCD_CAN. As depicted in TABLE 1, a unique route-target has been assigned to each of the defined datacenter profiles.

A NCD_<region> datacenter profile corresponds to a network care datacenter requiring visibility into the managed assets located within customer virtual private networks within the specific region. Similarly, a CCD_<region> datacenter profile corresponds to a customer care datacenter requiring visibility into the managed assets located within customer virtual private networks within the specific region. The route-targets depicted in TABLE 1 are examples. Any suitable route-target as known in the art may be assigned to a datacenter profile.

A datacenter participating in network management is assigned only one of the possible datacenter profiles, and therefore is assigned one corresponding route-target for export of its prefixes into the service provider network. The customer virtual private networks (routing/forwarding instances) import the route-targets associated with any datacenter profile corresponding to the geographic region in which the respective customer virtual private networks are located. The route-target imports are performed on provider edge routers associated with customer virtual private networks managed by the datacenter.

The route-target imports on provider edge routers associated with a customer virtual private network are performed independent of the route-target assigned to the datacenter responsible for managing that customer virtual private network. This decouples the route-target imports performed on the provider edge routers from the datacenter profile of the datacenter managing the customer virtual private networks associated with those provider edge routers.

As such, each customer virtual private network imports the route-target associated with the NCD_GBL and the CCD_GBL datacenter profiles, as well as any datacenter profile that includes the geographic region in which the respective customer virtual private networks (customer virtual private network routing/forwarding instances) are located. This datacenter profile route-target import policy is summarized in TABLE 2.

TABLE 2

| Customer VPN (VRF) Region | Provider Edge Router Route-Target Import Policy |
|---|---|
| US | NCD_GBL, NCD_US, CCD_GBL, CCD_US |
| EMEA | NCD_GBL, NCD_MOW, NCD_EMEA, CCD_GBL, CCD_MOW, CCD_EMEA |
| AP | NCD_GBL, NCD_MOW, NCD_AP, CCD_GBL, CCD_MOW, CCD_AP |
| CALA | NCD_GBL, NCD_MOW, NCD_CALA, CCD_GBL, CCD_MOW, CCD_CALA |
| CAN | NCD_GBL, NCD_MOW, NCD_CAN, CCD_GBL, CCD_MOW, CCD_CAN |

By default, assets located within customer virtual private networks (such as edge communication links, customer edge routers, equipment subtending from customer edge routers, and the like) belong to the customer virtual private networks. In order for a service provider datacenter to manage assets located within a customer virtual private network, routing between the datacenter and the managed assets located within customer virtual private networks must be enabled. In particular, routes representing the managed assets must be communicated to the datacenter network. Furthermore, routes representing the datacenter network must be communicated into the customer virtual private networks (routing/forwarding instances) that encapsulate the managed assets.

As such, in one further embodiment, managed asset responsibility is divided across datacenters by asset type. In order to split managed asset responsibility across datacenters by asset type, a separate profile is defined for each combination of managed asset type and managed asset geographic location. A managed asset type corresponds to the type of managed asset located within a customer virtual private network that is managed by a service provider. Some examples of managed asset types include edge communication links (ECL), managed customer edge routers (MCER), managed digital/circuit switching units (MSU), managed firewalls (MF), and the like. Fewer or more managed asset types may be defined.

In one embodiment, additional managed asset types may be defined to represent equipment subtending from a customer edge router located within a customer virtual private network. In another embodiment, a distinction is made between managed digital switching units and managed circuit switching units for virtual private network customers and managed digital switching units and managed circuit switching units for non-VPN customers. In another embodiment, route-targets are assigned to managed asset profiles that are defined by the customer owning the managed assets rather than by geographic location of the managed assets.

A managed asset geographic location corresponds to a geographic region of the world in which the managed assets are located. Some examples of managed asset geographic locations include the United States (US), Europe/Middle East/Africa (EMEA), Asian/Pacific (AP), Canada/Latin America (CALA), Canada (CAN), and the like. Fewer or more managed asset geographic locations may be defined.

A separate managed asset profile is defined for each combination of managed asset type and managed asset geographic location. The service provider management system (such as virtual private network management system 160) assigns a unique route-target to each profile representing a combination of one managed asset type and one managed asset geographic location. TABLE 3 depicts the separate managed asset profiles defined for each combination of managed asset type and managed asset geographic location listed above. Since fewer or more managed asset types and managed asset geographic locations may be defined, fewer or more managed asset profiles than those depicted in TABLE 3 may be defined.

TABLE 3

| Managed Asset Type | Managed Asset Geographic Location | Managed Asset Profile | Route-Target Assignment |
| --- | --- | --- | --- |
| ECL | US | ECL_US | 13976:108010 |
| ECL | EMEA | ECL_EMEA | 13976:108020 |
| ECL | AP | ECL_AP | 13976:108030 |
| ECL | CALA | ECL_CALA | 13976:108040 |
| ECL | CAN | ECL_CAN | 13976:108050 |
| MCER | US | MCER_MOW | 13976:108110 |
| MCER | EMEA | MCER_EMEA | 13976:108120 |
| MCER | AP | MCER_AP | 13976:108130 |
| MCER | CALA | MCER_US | 13976:108140 |
| MCER | CAN | MCER_CALA | 13976:108150 |
| MSU | US | MSU_US | 13976:108210 |
| MSU | EMEA | MSU_EMEA | 13976:108220 |
| MSU | AP | MSU_AP | 13976:108230 |
| MSU | CALA | MSU_CALA | 13976:108240 |
| MSU | CAN | MSU_CAN | 13976:108250 |
| MF | US | MF_MOW | 13976:108310 |
| MF | EMEA | MF_EMEA | 13976:108320 |
| MF | AP | MF_AP | 13976:108330 |
| MF | CALA | MF_US | 13976:108340 |
| MF | CAN | MF_CALA | 13976:108350 |

As depicted in TABLE 3, the valid managed asset profiles defined using combinations of managed asset type and managed asset geographic location include ECL_US, ECL_EMEA, ECL_AP, ECL_CALA, ECL_CAN, MCER_MOW, MCER_EMEA, MCER_AP, MCER_US, MCER_CALA, MSU_US, MSU_EMEA, MSU_AP, MSU_CALA, MSU_CAN, MF_MOW, MF_EMEA, MF_AP, MF_US and MF_CALA. As depicted in TABLE 3, a unique route-target has been assigned to each of the defined datacenter profiles.

In one embodiment, the datacenter types, datacenter geographic scopes of responsibility, and datacenter profiles, as well as the managed asset types, managed asset geographic locations, and managed asset profiles are defined by one or more users of the virtual private network management system 160. In another embodiment, the datacenter types, datacenter geographic scopes of responsibility, and datacenter profiles, as well as the managed asset types, managed asset geographic locations, and managed asset profiles are imported into virtual private network management system from at least one other system, and then stored on the virtual private network management system. In another embodiment, the datacenter types, datacenter geographic scopes of responsibility, and datacenter profiles, as well as the managed asset types, managed asset geographic locations, and managed asset profiles are retrieved by the virtual private network management system from at least one other service provider system.

As depicted in FIG. 2, assume that datacenter 240 is a new network care datacenter that will be managing the global network of the service provider. At the time the datacenter 240 is turned-up, datacenter 240 is assigned a unique route distinguisher (13796:101000, for example), and a unique VRF-Name (NCD_TMPFL, for example). The datacenter edge router 230 is then configured to support the assigned route distinguisher and the assigned VRF-Name. The datacenter 240 is assigned the NCD_GLB datacenter profile. A route-target export statement corresponding to the export of the route-target associated with the NCD_GBL datacenter profile is defined on the datacenter edge router 230 (as a portion of the definition corresponding to the route distinguisher and VRF-Name configured on the datacenter edge router 230).

The preparatory assignments corresponding to defined datacenter profiles are made in the service provider network 102. As depicted in FIG. 2, provider edge routers PER$_1$ and PER$_2$ associated with the first virtual private network 210 (located in the United States) import the unique route-targets associated with the NCD_GBL, NCD_US, CCD_GBL, and CCD_US datacenter profiles. Similarly, as depicted in FIG. 2, the provider edge routers PER$_3$ and PER$_4$ associated with the second virtual private network 220 (located in Europe, the Middle East, and Africa) imports the unique route-targets associated with the NCD_GBL, NCD_MOW, NCD_EMEA, CCD_GBL, and CCD_MOW, and CCD_EMEA datacenter profiles. The importing and exporting of route-targets on provider edge routers is accomplished using any standard method of importing and exporting route-targets as known in the art.

Using the methodology of the present invention, a customer virtual private network routing/forwarding instance only requires reconfiguration in response to the addition of a new datacenter profile having a datacenter geographic scope of responsibility in which that customer virtual private network is located. The present invention obviates the need to reconfigure customer virtual private networks in response to the addition of a new datacenter, the deletion of an existing datacenter, and the changing of datacenter geographic scope of responsibility. For example, if a new datacenter profile is created to include a combination of the United States and Asian/Pacific regions, respective route-targets corresponding to the new datacenter profiles (NCD_USAP and CCD_U-SAP) must be imported to each customer virtual private network in the United States and the Asian/Pacific region.

In one embodiment, the present invention further assumes that the scope of datacenter 240 is limited to managing edge communication links and customer edge routers located within customer virtual private networks. Since datacenter 240 is a global network care datacenter, edge communication links and customer edge routers located globally fall within scope of responsibility of datacenter 240. As such, in addition to NCD_GBL route-target export statement, import statements for route-targets associated with ECL_US, ECL_EMEA, ECL_AP, ECL_CALA, ECL_CAN, MCER_US, MCER_EMEA, MCER_AP, MCER_GALA, and MCER_CAN managed asset profiles are defined on the datacenter edge router 230.

In this embodiment, preparatory assignments corresponding to managed asset profiles are made in the service provider network 102. As depicted in FIG. 2, the first virtual private network 210 (which is located in the United States) exports the unique route-targets associated with the ECL_US and MCER_US managed asset profiles. The route-target exports are performed on provider edge routers $PER_1$ and $PER_2$ to which customer edge routers $CER_1$ and $CER_2$ are connected, respectively. Similarly, as depicted in FIG. 2, the second virtual private network 220 (which is located in Europe, the Middle East, and Africa) exports the unique route-targets associated with the ECL_EMEA and MCER_EMEA managed asset profiles. The route-target exports are performed on provider edge routers $PER_3$ and $PER_4$ to which customer edge routers $CER_3$ and $CER_4$ are connected, respectively.

In one embodiment, in which a new datacenter is added to manage at least a portion of a service provider network, the present invention obviates the need to reconfigure the customer virtual private networks. For example, as depicted in FIG. 2, assume that the datacenter 250 has been added to manage a portion of service provider network 102. The datacenter 250 comprises at least one service provider management system (illustratively, virtual private network management system 252) and at least one datacenter router for facilitating communication with the service provider network 102 (illustratively, datacenter core router 254).

As depicted in FIG. 2, the virtual private network management system 252 communicates with the datacenter core router 254 via communication link 256, and datacenter core router 254 communicates with datacenter edge router 230 via communication link 258. Although depicted in FIG. 2 as communicating with the service provider network 102 via the datacenter edge router 230, the datacenter core router 254 may communicate with another datacenter edge router (not shown) in communication with at least one of the provider core routers 110 and the provider edge routers 120.

For the purposes of this example, assume that the new datacenter is responsible for providing customer care support for customer virtual private networks located within Europe, the Middle East, and Africa. As such, the CCD_EMEA datacenter profile is assigned to the added datacenter 250. Since the unique route-target corresponding to CCD_EMEA was previously imported on provider edge routers $PER_3$ and $PER_4$ supporting the second virtual private network 220, the addition of datacenter 250 does not require reconfiguration of the second virtual private network 220.

At the time datacenter 250 is turned-up, datacenter 250 is assigned a unique route distinguisher (13796:105000, for example), and a unique VRF-Name (CCD_NWKNJ, for example). The datacenter edge router 230 is then configured to support the assigned route distinguisher and the assigned VRF-Name. The datacenter 250 is assigned the CCD_EMEA datacenter profile, and a route-target export statement for the export of the route-target associated with the CCD_EMEA datacenter profile is defined on the datacenter edge router 230 (as a portion of the definition corresponding to the route distinguisher and VRF-Name configured on the datacenter edge router 230).

As such, in this embodiment, only the datacenter edge router 230 requires reconfiguration in order to support the addition of datacenter 250 for management of the second virtual private network 220, and other virtual private networks located within the EMEA geographic region (not shown). Since the preparatory assignments described above with respect to the datacenter 230 included an import of the route-target associated with the CCD_EMEA profile on each of the provider edge routers supporting second virtual private network 220, second virtual private network 220 is already configured to be managed by new datacenter 250. Thus, the present invention obviates the need to reconfigure provider edge routers associated with second virtual private network 220.

In one embodiment, the present invention further assumes that the scope of datacenter 250 is limited to managing edge communication links located within customer virtual private networks. Since datacenter 250 is managing the EMEA region, edge communication links associated with customer virtual private networks located within Europe, the Middle East, and Africa fall within the scope of responsibility of datacenter 250. As such, an import statement for the route-target associated with the ECL_EMEA managed asset profile is configured on datacenter edge router 230, in addition to configuration of the CCD_EMEA route-target export statement.

Since the route-targets corresponding to edge communication links $150_3$ and $150_4$ are already being exported by provider edge routers $PER_3$ and $PER_4$, implementation of a limitation on the scope of managed assets managed by datacenter 250 does not require reconfiguration of the second virtual private network 220. Furthermore, since datacenter 250 is responsible for managing edge communication links within the EMEA region, the datacenter 250 is not responsible for managing the first virtual private network 210 (and as such, reconfiguration of provider edge routers $PER_1$ and $PER_2$ is not required). As such, only the datacenter edge router 230 requires reconfiguration to support the limitation of the scope of managed asset responsibility of datacenter 250.

In one embodiment, in which the scope of an existing datacenter is narrowed, the present invention obviates the need to reconfigure the customer virtual private networks supported by the service provider network being managed. For example assume that the geographic scope of responsibility of the datacenter 240 has been changed from the global region (GBL) to only managing customer virtual private networks within the United States (US). In this example, since the first virtual private network 210 is located within the United States, datacenter 240 continues to manage that customer virtual private network; however, since second virtual private network 220 is located within the EMEA region, datacenter 240 no longer manages that customer virtual private network.

In order to narrow the geographic scope of responsibility of datacenter 240, reconfiguration is only required on the datacenter edge router 230. In this embodiment, datacenter 240 continues to use the previously assigned route-distinguisher (13796:101000) and VRF-Name (NCD_TMPFL). The datacenter 240 is assigned the NCD_US profile, and the previously configured statement for exporting the route-target corresponding to the NCD_GBL profile is replaced by a statement for exporting the route-target corresponding to the NCD_US profile. The NCD_US route-target export statement is configured on the datacenter edge router 230, and is performed using any standard method of importing route-targets as known in the art.

Since the route-target corresponding to the NCD_US datacenter profile was previously applied on the provider edge routers $PER_1$ and $PER_2$, reconfiguration of the first virtual private network 210 is not required. Similarly, although not depicted in FIG. 2, reconfiguration of other customer virtual private networks within the United States is not required. In other words, since every customer virtual private network routing/forwarding instance in the United States network is already importing the unique route-target corresponding to NCD_US, no change is required to any customer virtual private network in order to support a change in geographic scope of responsibility of datacenter 240. Furthermore, since the datacenter edge router 230 is no longer advertising (exporting) the NCD_GBL route-target, the datacenter 230 is automatically removed from the NCD_GBL datacenter profile with no impact to the customer virtual private networks.

In one further embodiment, in which the scope of datacenter 240 is limited to managing edge communication links and customer edge routers, a change in the datacenter geographic scope of responsibility results in a corresponding change to the importing of route-targets of managed assets. Since, as described above, datacenter 240 is no longer a global network care datacenter (changed to a US network care center), the edge communication links and customer edge routers located globally no longer fall within the scope of responsibility of datacenter 240.

As such, import statements for route-targets associated with the ECL_EMEA, ECL_AP, ECL_CALA, ECL_CAN, MCER_EMEA, MCER_AP, MCER_CALA, and MCER_CAN managed asset profiles are no longer required on datacenter edge router 230. In order to support the change in datacenter geographic scope of responsibility, the datacenter edge router 230 is reconfigured to only import the route-targets associated with the ECL_US and MCER_US managed asset profiles.

Since the first virtual private network 210 is located within the United States, the datacenter 240 is no longer responsible for managing the second virtual private network 220. As described above, the second virtual private network 220 is located within the EMEA region, and as such, the datacenter 240 only continues to manage the first virtual private network 210. Since the route-targets corresponding to edge communication links $150_1$ and $150_2$ are already being exported by provider edge routers $PER_1$ and $PER_2$, the change in the scope of the managed asset types managed by datacenter 240 does not require reconfiguration of the first virtual private network 210.

In another embodiment, in which datacenter type is changed and the datacenter geographic scope of responsibility scope is broadened, the present invention obviates the need to reconfigure associated customer virtual private networks. For example, assume that the datacenter type of datacenter 250 is changed from a customer care datacenter (CCD) to a network care datacenter (NCD). Further assume that the datacenter geographic scope of responsibility of the datacenter 250 is changed from the EMEA region to managing customer virtual private networks everywhere in the world outside of the United States (MOW).

In this example, since second virtual private network 220 is located within the EMEA region, and the EMEA region is located within the MOW region, datacenter 250 continues to manage that customer virtual private network, as well as other customer virtual private networks located outside of the United States. Since the first virtual private network 210 is located within the United States, the datacenter 250 still does not manage that customer virtual private network.

In order to change the geographic scope of responsibility of the datacenter 250, reconfiguration is only required on the datacenter edge router 230. In this embodiment, datacenter 250 continues to use the previously assigned route-distinguisher (13796:105000). In this embodiment, datacenter 250 may be assigned a more representative VRF-Name (NCD_NWKNJ, for example), although the previously assigned VRF-Name (CCD_NWKNJ) may be used. In an embodiment in which the VRF-Name is changed to NCD_NWKNJ, datacenter edge router 230 is reconfigured to support the newly assigned VRF-Name.

The datacenter 250 is assigned the NCD_MOW profile, and the previously defined statement for exporting the route-target corresponding to the CCD_EMEA profile is replaced by a statement for exporting the route-target corresponding to the NCD_MOW profile. The NCD_MOW route-target export statement is configured on the datacenter edge router 230, and is performed using any standard method of importing route-targets as known in the art.

Since the route-target corresponding to the NCD_MOW datacenter profile was previously assigned on provider edge routers $PER_3$ and $PER_4$, reconfiguration of the second virtual private network 220 is not required. Similarly, although not depicted in FIG. 2, reconfiguration of other customer virtual private networks within the EMEA region is not required. In other words, since every customer virtual private network routing/forwarding instance in the EMEA region is already importing the route-target corresponding to NCD_MOW, no change is required to any customer virtual private network in order to support the change in geographic scope of responsibility. Furthermore, since datacenter edge router 230 is no longer advertising (exporting) the NCD_EMEA route-target, the datacenter 250 is automatically removed from the NCD_EMEA datacenter profile with no impact to the customer virtual private networks.

In one further embodiment, in which the scope of datacenter 250 is limited to managing edge communication links, a change in datacenter geographic scope of responsibility results in a corresponding change to the importing of route-targets associated with managed asset profiles. Since the datacenter geographic scope of responsibility of datacenter 250 is expanded to include the MOW region, all edge communication links located in the MOW region are within the scope of responsibility of datacenter 250.

In addition to the import statements for route-targets associated with the ECL_EMEA managed asset profile, import statements for the route-targets associated with edge communication links located within the MOW region must be applied on the datacenter edge router 230. As such, in order to support the change in datacenter geographic scope of responsibility from EMEA to MOW, the datacenter edge router 230 is reconfigured to import the route-targets associated with the ECL_AP, ECL_CALA, and ECL_CAN managed asset profiles.

Since the first virtual private network 210 is located within the United States, datacenter 250 is still not responsible for managing the first virtual private network 210. As described above, the second virtual private network 220 is located within the EMEA region, and as such, the datacenter 250 continues to manage the second virtual private network 220, as well as other customer virtual private networks located outside of the United States. Since the route-targets corresponding to edge communication links $150_3$ and $150_4$ are already being exported by provider edge routers $PER_3$ and $PER_4$, the change in the scope of the managed assets managed by the datacenter 250 does not require reconfiguration of the second virtual private network 220.

In one further embodiment, the present invention assumes that the scope of the managed asset types being managed by datacenter 250 is changed such that datacenter 250 is responsible for managing customer edge routers in addition to edge communication links. In this embodiment, in addition to the import statements for route-targets associated with the ECL_EMEA, ECL_AP, ECL_CALA, and ECL_CAN managed asset profiles, the datacenter edge router 230 is configured to import the route-targets associated with the MCER_EMEA, MCER_AP, MCER_CALA, and MCER_CAN managed asset profiles.

In this embodiment, since first virtual private network 210 is located within the United States, datacenter 250 is still not responsible for managing the first virtual private network 210. Since the route-targets corresponding to the customer edge routers $CER_3$ and $CER_4$ are already being exported by provider edge routers $PER_3$ and $PER_4$, the change in the scope of the managed assets managed by the datacenter 250 does not require reconfiguration of the second virtual private network 220.

As such, the methodology of the present invention obviates the need to reconfigure customer virtual private networks (customer virtual private network routing/forwarding instances) in response to the addition of a new datacenter, change of the datacenter type, narrowing of the datacenter geographic scope of responsibility, broadening of the datacenter geographic scope of responsibility, and the link, either singly or in combination. Furthermore, the methodology of the present invention obviates the need to reconfigure customer virtual private networks (customer virtual private network routing/forwarding instances) in response to changes in managed asset types and managed asset geographic locations, either singly or in combination, supported by a particular datacenter.

Using the methodologies of the present invention, the number of routes imported into a customer virtual private network on a provider edge router equals the number of datacenters authorized to manage that customer. Furthermore, the number of routes exported from a customer virtual private network on a provider edge router equals the number of managed assets that are located within that customer virtual private network. Thus, implementation of the present invention eliminates any previous scalability issues associated with provider edge routers.

The number of routes that need to be imported into the datacenter edge router equals the number of managed assets in all customer virtual private networks supported by that datacenter. As such, using the methodology of the present invention to split managed assets across datacenters by managed asset type and geographic location reduces the number of routes that need to be imported into a datacenter edge router, thus mitigating any associated scalability issue. A large-scale growth in a service provider's virtual private network customer base may result in a large number of route imports of managed assets on a datacenter edge router. The present invention mitigates reaching upper limits in terms of the total number of route-targets per provider edge router.

Figure 3:
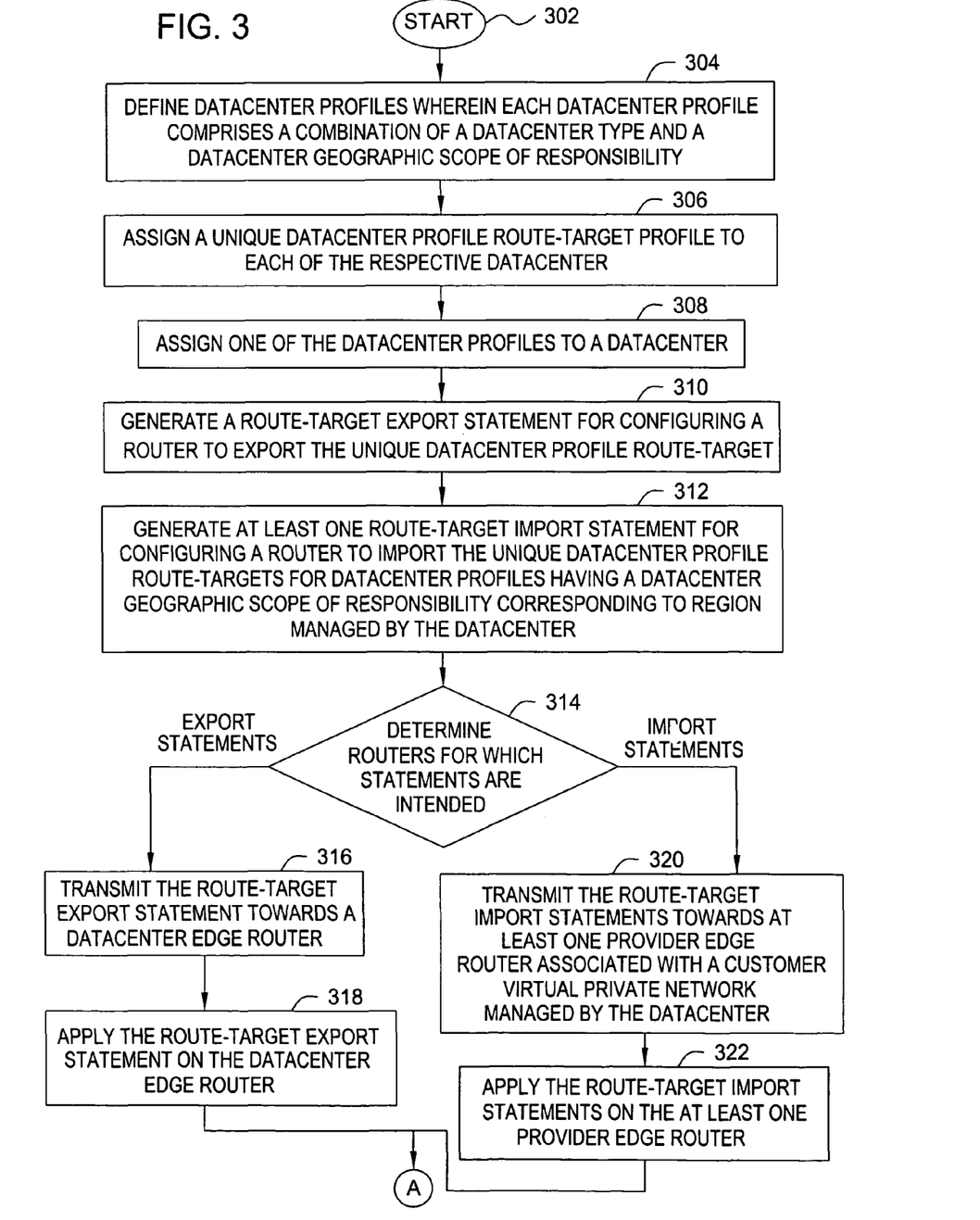
FIG. 3 depicts a flow diagram of a method according one embodiment of the invention.

FIG. 3 depicts a flow diagram of a method according to one embodiment of the invention. Specifically, the method 300 of figure comprises a method of deriving router configuration of at least one edge router and at least one provider edge router to support at least one datacenter managing a plurality of customer virtual private networks. The method 300 is entered at step 302 and proceeds to step 304.

At step 304, a service provider management system (such as virtual private network management system 160) defines datacenter profiles, wherein each datacenter profile comprises a combination of a datacenter type and a datacenter geographic scope of responsibility. The method 300 then proceeds to step 306. At step 306, the service provider management system assigns a unique route-target value to each of the respective datacenter profiles defined in step 304. The method 300 then proceeds to step 308.

At step 308, the service provider management system assigns one of the datacenter profiles to the datacenter. At step 310, the service provider management system generates (derives) a route-target export statement for configuring a router to export the unique route-target associated with the datacenter profile assigned in step 308. In other words, this step of deriving a datacenter router export configuration comprises deriving at least one router configuration statement that is associated with at least one datacenter edge router in communication with the at least one customer virtual private network.

At step 312, the service provider management system generates (derives) at least one route-target import statement for configuring a router to import the unique datacenter profile route-targets for datacenter profiles having a datacenter geographic scope of responsibility corresponding to the region managed by the datacenter. In other words, this step of deriving a datacenter router import configuration comprises deriving at least one router configuration statement that is associated with at least one provider edge router in communication with the at least one customer virtual private network.

At step 314, the service provider management system determines the datacenter edge router (or routers) for which the route-target export statement is intended. The service provider management system determines the provider edge router (or routers) for which the generated route-target import statements are intended. For the export-statement, the method 300 proceeds to step 316. For the import statement(s), the method 300 proceeds to step 320. As such, steps 316 and 318 and steps 320 and 322 may be performed serially or in parallel.

At step 316, the service provider management system transmits the route-target export statement corresponding to the datacenter profile assigned to the datacenter towards the datacenter edge router. At step 318, the datacenter edge router receives the route-target export statement and applies (stores) the route-target export statement to configure the datacenter edge router to export the route-target associated with the assigned datacenter profile. The at least one router configuration statement is used by the datacenter edge router to determine which customer virtual private networks are managed by the datacenter. The method 300 then proceeds to step 324.

At step 320, the service provider management system transmits the generated route-target import statements towards the provider edge router(s) supporting customer virtual private networks to be managed by the datacenter. At step 322, the provider edge router(s) receive the route-target import statements and apply (store) the route-target import statements to configure the provider edge router(s) to import the route-targets associated with datacenter profiles having a datacenter geographic scope of responsibility corresponding to the region in which each customer virtual private network (provider edge router) is located. The at least one router configuration statement is used by the at least one provider edge router to communicate with the datacenter managing the at least one customer virtual private network in communication with the at least one provider edge router. The method 300 then proceeds to step 324.

At step 324, the service provider management system determines if the datacenter will be responsible for managing particular types of managed assets. If the datacenter is not responsible for managing particular types of managed assets, the method 300 proceeds to step 326 where the method 300 ends. If the datacenter is responsible for managing particular types of managed assets the method 300 proceeds to step 328.

At step 328, the service provider management system defines managed asset profiles, wherein each managed asset profile comprises a combination of a managed asset type and managed asset geographic location. The method 300 then proceeds to step 330. At step 330, the service provider management system assigns a unique route-target value to each of the respective managed asset profiles defined in step 328. The method 300 then proceeds to step 332.

At step 332, the service provider management system generates at least one route-target import statement for configuring a router to import the unique route-targets associated with managed asset profiles having managed asset types that the datacenter is responsible for managing. At step 334, the service provider management system transmits the at least one route-target import statement towards a datacenter edge router. At step 336, the datacenter edge router receives the route-target import statement(s) and applies the route-target import statement(s) in order to configure itself to import route-targets associated with the managed assets within the scope of responsibility of the datacenter. The method 300 proceeds to step 338 where method 300 ends.

Figure 4:
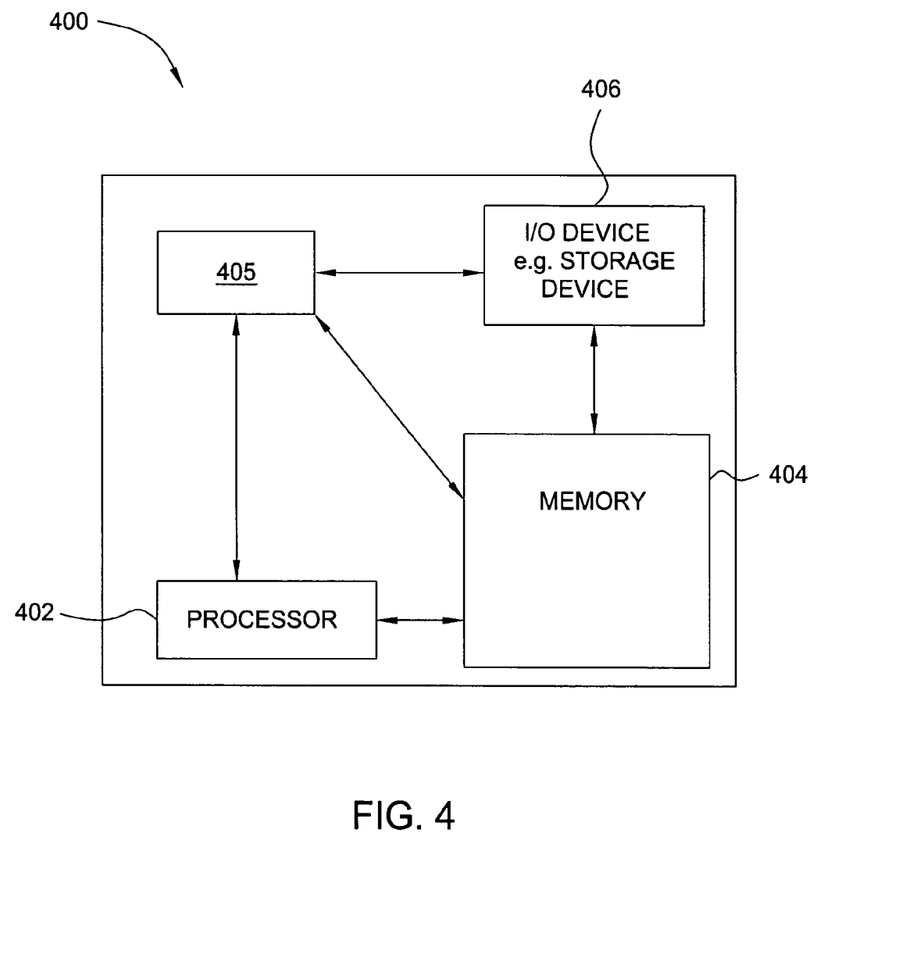
FIG. 4 depicts a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a router configuration module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present router configuration module or process 405 can be loaded into memory 404 and executed by processor 402 to implement the functions as discussed above. As such, the present router configuration process 405 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for deriving at least one router configuration of at least one datacenter edge router and at least one provider edge router to support at least one datacenter managing at least one customer virtual private network, comprising:
assigning, via a service provider management system, at least one datacenter profile to said at least one datacenter;
assigning, via said service provider management system, a datacenter profile route-target to said at least one datacenter profile;
deriving, via said service provider management system, a datacenter router export configuration for exporting said datacenter profile route-target; and
deriving, via said service provider management system, a datacenter router import configuration for importing said datacenter profile route-target.

2. The method of claim 1, wherein said at least one datacenter profile is formed using a combination of at least one datacenter type and at least one datacenter geographic scope of responsibility.

3. The method of claim 1, wherein said deriving said datacenter router export configuration comprises deriving at least one router configuration statement that is associated with at least one datacenter edge router in communication with said at least one customer virtual private network.

4. The method of claim 3, wherein said at least one router configuration statement includes at least one route-target export statement.

5. The method of claim 4, further comprising:
transmitting said at least one router configuration statement towards said at least one datacenter edge router for which said at least one router configuration statement is derived.

6. The method of claim 5, further comprising:
receiving by said at least one datacenter edge router said at least one router configuration statement, wherein said at least one router configuration statement is stored in a router configuration of said at least one datacenter edge router.

7. The method of claim 6, wherein said at least one router configuration statement is used by said at least one datacenter edge router to determine which of said at least one customer virtual private network is managed by said at least one datacenter.

8. The method of claim 1, wherein said deriving said datacenter router import configuration comprises deriving at least one router configuration statement that is associated with at least one provider edge router in communication with said at least one customer virtual private network.

9. The method of claim 8, wherein said at least one router configuration statement includes at least one route-target import statement.

10. The method of claim 9, wherein said at least one route-target import statement is derived according to a location of said at least one customer virtual private network to which said at least one provider edge router is connected.

11. The method of claim 9, further comprising:
transmitting said at least one router configuration statement towards said at least one provider edge router for which said at least one router configuration statement is derived.

12. The method of claim 11, further comprising:
receiving by said at least one provider edge router said at least one router configuration statement, wherein said at least one router configuration statement is stored in a router configuration of said at least one provider edge router.

13. The method of claim 1, further comprising:
assigning at least one managed asset profile to said at least one datacenter;
assigning a managed asset profile route-target to said at least one managed asset profile; and
deriving a managed asset router import configuration for importing said managed asset profile route-target.

14. An apparatus for deriving at least one router configuration of at least one datacenter edge router and at least one provider edge router to support at least one datacenter managing at least one customer virtual private network, comprising:
means for assigning at least one datacenter profile to said at least one datacenter;
means for assigning a datacenter profile route-target to said at least one datacenter profile;
means for deriving a datacenter router export configuration for exporting said datacenter profile route-target; and
means for deriving a datacenter router import configuration for importing said datacenter profile route-target.

15. A computer readable medium storing a software program that, when executed by a computer, causes the computer to perform a method comprising:
assigning at least one datacenter profile to at least one datacenter;

assigning a datacenter profile route-target to said at least one datacenter profile;

deriving a datacenter router export configuration for exporting said datacenter profile route-target; and deriving a datacenter router import configuration for importing said datacenter profile route-target.

16. A method for deriving at least one router configuration of at least one datacenter edge router and at least one provider edge router to support at least one datacenter managing at least one managed asset type for at least one customer virtual private network, comprising:

assigning, via a service provider management system, at least one managed asset profile to said at least one datacenter;

assigning, via said service provider management system, a managed asset profile route-target to said at least one managed asset profile; and deriving, via said service provider management system, a managed asset router import configuration for importing said managed asset profile route-target.

17. The method of claim 16, wherein said at least one managed asset profile is formed using a combination of at least one managed asset type and at least one managed asset geographic location.

* * * * *